United States Patent
Maruyama

(10) Patent No.: US 8,296,518 B2
(45) Date of Patent: Oct. 23, 2012

(54) ARITHMETIC PROCESSING APPARATUS AND METHOD

(75) Inventor: Masaharu Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 302 days.

(21) Appl. No.: 12/624,531

(22) Filed: Nov. 24, 2009

(65) Prior Publication Data

US 2010/0070708 A1    Mar. 18, 2010

Related U.S. Application Data

(63) Continuation of application No. PCT/JP2007/062338, filed on Jun. 19, 2007.

(51) Int. Cl.
*G06F 12/08* (2006.01)
*G06F 12/10* (2006.01)

(52) U.S. Cl. ............... 711/118; 711/207; 711/E12.017; 711/E12.064

(58) Field of Classification Search .................. None
See application file for complete search history.

(56) References Cited

U.S. PATENT DOCUMENTS

| | | | |
|---|---|---|---|
| 5,465,337 A | 11/1995 | Kong | |
| 5,479,627 A | 12/1995 | Khalidi et al. | |
| 5,956,756 A | 9/1999 | Khalidi et al. | |
| 6,490,658 B1 | 12/2002 | Ahmed et al. | |
| 2007/0043531 A1* | 2/2007 | Kosche et al. | 702/182 |

FOREIGN PATENT DOCUMENTS

| | | |
|---|---|---|
| EP | 1 204 029 A2 | 5/2002 |
| EP | 1 944 696 A1 | 7/2008 |
| JP | 60-074058 | 4/1985 |
| JP | 62-151958 | 7/1987 |
| JP | 1-106149 | 4/1989 |
| JP | 02-289013 | 11/1990 |
| JP | 03-036647 | 2/1991 |
| JP | 7-200409 | 8/1995 |
| JP | 2001-290706 | 10/2001 |
| JP | 2007-122667 | 5/2007 |
| WO | 2007/052369 | 5/2007 |

OTHER PUBLICATIONS

Japanese Office Action issued on Jul. 6, 2010 in corresponding Japanese Patent Application 2009-520179.
European Search Report dated Oct. 5, 2010 in corresponding European Patent Application 07767196.4.
International Search Report for PCT/JP2007/062338, mailed Sep. 11, 2007.

\* cited by examiner

*Primary Examiner* — Denise Tran
(74) *Attorney, Agent, or Firm* — Staas & Halsey LLP

(57) ABSTRACT

An apparatus includes a TLB storing a part of a TSB area included in a memory accessed by the apparatus. The TSB area stores an address translation pair for translating a virtual address into a physical address. The apparatus further includes a cache memory that temporarily stores the pair; a storing unit that stores a starting physical address of the pair stored in the memory unit; a calculating unit that calculates, based on the starting physical address and a virtual address to be converted, a TSB pointer used in obtaining from the TSB area a corresponding address translation pair corresponding to the virtual address to be converted; and an obtaining unit that obtains the corresponding pair from the TSB area using the TSB pointer calculated and stores the corresponding pair in the cache memory, if the corresponding pair is not retrieved from the TLB or the cache memory.

8 Claims, 6 Drawing Sheets

FIG.3

Context NUMBER=0(kernel mode) INSTRUCTION 1st-TLB
Context NUMBER=0(kernel mode) INSTRUCTION 2nd-TLB
Context NUMBER=0(kernel mode) DATA 1st-TLB
Context NUMBER=0(kernel mode) DATA 2nd-TLB
Context NUMBER≠0(user mode) INSTRUCTION 1st-TLB
Context NUMBER≠0(user mode) INSTRUCTION 2nd-TLB
Context NUMBER≠0(user mode) DATA 1st-TLB
Context NUMBER≠0(user mode) DATA 2nd-TLB

FIG.4

TSB pointer = TSB_base[63:13+N] | VA[21+N+3*page_sz:13+3*page_sz] | 0000

US 8,296,518 B2

1

ARITHMETIC PROCESSING APPARATUS AND METHOD

CROSS-REFERENCE TO RELATED APPLICATION(S)

This application is a continuation of International Application No. PCT/JP2007/062338, filed on Jun. 19, 2007, the entire contents of which are incorporated herein by reference.

FIELD

The embodiments discussed herein are directed to an arithmetic processing apparatus, an arithmetic processing program, and an arithmetic processing method.

BACKGROUND

Conventionally, many computers employ the "virtual storage method". The "virtual storage method" is a technology that makes a memory capacity greater than an actual memory capacity in a computer appear to be provided on the computer by using an external memory device (e.g., a hard disk device) as a save area of a memory. Thus, when the memory capacity becomes insufficient, the "virtual storage method" temporarily saves less-frequently-used information among information on the memory to a swap area that has been secured within the hard disk device by an OS, to temporarily compensate for the insufficiency in the memory capacity.

In the "virtual storage method", two addresses, a virtual address (VA) and a physical address (PA), are used. When an application side performs reading and writing (memory access) with respect to a memory, a virtual address is used. A physical address is an address assigned to a component of a memory. For the purpose of translating a virtual address into a physical address, a computer employing the virtual storage method, stores a list (hereinafter referred to as "page table") of address translation pairs (translation table entry: TTE) for translating virtual addresses into physical addresses.

Normally, the page table is stored in a translation storage buffer (TSB) area of a main memory. However, if a central processing unit (CPU) is to refer to the page table stored in the main memory every time a translation from a virtual address (TTE-tag) into a physical address (TTE-data) is required, since access from the CPU to the main memory cannot be fast, a longer period of time is to be spent on the translation. To avoid this, normally, a cache memory dedicated to address translation and referred to as a translation-lookaside buffer (TLB) or address translation buffer is installed inside the CPU. The TLB stores some of the address translation pairs from the page table stored in the TSB area.

To perform a memory access with such a configuration, the CPU first searches the TLB. For the TLB search, the CPU uses a virtual address and a context ID (a unique ID for each process). If the values used for the TLB search and values stored in the TLB match each other with respect to these two, it is assumed that an address translation result is present in the TLB, and the CPU obtains the address translation result. When the address translation result corresponding to the requested address and context ID is present in the TLB, it is called a TLB hit. When not present, it is called a TLB miss (memory management unit-MISS: MMU-MISS). When a TLB miss occurs, an MMU-MISS-TRAP is generated. The CPU thus reports the generation of MMU-MISS-TRAP to the OS and the OS that has been reported performs a trap handling process with respect to the CPU.

2

Conventional technologies (mainly related to the trap handling process) disclosed in Japanese Laid-open Patent Publication No. 2007-122667 and Japanese Laid-open Patent Publication No. 07-200409 are described with reference to FIG. 7. FIG. 7 is a diagram for explaining the conventional technologies. Inherently, a memory access process performed by the CPU is branched depending on a plurality of determinations during the process. However, for convenience in clearly explaining differences between (A) and (B), in FIG. 7, the process is illustrated without determinations and a distinguishing a normal trap handling process from other processes. In FIG. 7, the portion surrounded by a rectangle indicates steps common between (A) and (B).

First, the description is given regarding (A) in FIG. 7. If, during a memory access, the CPU fails in the TLB search (TLB miss) with a certain virtual address specified by the OS, then an MMU-MISS-TRAP is generated in the CPU (see (1)). The CPU then reports the MMU-MISS-TRAP to the OS, and thus the OS performs a trap handling process for the CPU. Specifically, the CPU sets the certain virtual address, for which the MMU-MISS-TRAP has been generated, in a register (see (2)). Then, based on the virtual address, the CPU generates a TSB virtual address that corresponds to the virtual address (see (3)). Herein, a TSB virtual address is a virtual address in the TSB area storing an address translation pair corresponding to the virtual address. The CPU sets the generated TSB virtual address in the register (See (4)).

Then, the CPU reads the virtual address and the TSB virtual address set in the register from the register (see (5)) and searches the TLB for an address translation pair of the TSB virtual address and a TSB physical address (TSB pointer) corresponding to the TSB virtual address (see (6)). The CPU then search a cache memory using the TSB physical address retrieved from the TLB (see (7)).

Herein, it is assumed that an address translation pair (address translation pair of the virtual address and the physical address) is not retrieved as a result of searching the cache memory (i.e., that a cache miss occurs). Thus, the CPU searches a main memory using the TSB physical address retrieved from the TLB (see (8)), reads the corresponding address translation pair from the main memory, and registers it in the cache memory (See (9)).

Subsequently, the CPU again searches the TLB for the address translation pair of the TSB virtual address and the TSB physical address corresponding to the TSB virtual address (see (10)). The CPU then searches the cache memory using the TSB physical address retrieved from the TLB (see (11)). Since the address translation pair is retrieved as a result of searching the cache memory (i.e., since the address translation pair is already registered in the cache memory at (9), cache miss does not occur), the CPU reads the address translation pair from the cache memory and registers it in the TLB (see (12)). In this way, when the CPU searches the TLB again for the certain virtual address, there is going to be a TLB hit.

Due to the cache miss occurring at (8) in the steps at (A) described above, the CPU needs to repeat the steps of (10) and (11) again. Thus, a penalty (such as delay) upon a cache miss is big. Accordingly, in Japanese Laid-open Patent Publication No. 2007-122667 a technique is proposed, as illustrated in which, apart from a normal trap handling process, the CPU searches the main memory using the TSB physical address retrieved from the TLB, obtains the address translation pair from the main memory, and pre-fetches the obtained address translation pair in the cache memory, as illustrated at (7) at (B) in FIG. 7.

In the abovementioned conventional technology, the penalty upon a TLB miss is still big as explained below. That is, in the conventional technology, the CPU still consumes time in the process of obtaining the address translation pair of the virtual address and the physical address from the TSB area of the main memory and pre-fetching that address translation pair in the cache memory. Specifically, in the conventional technology, for the CPU to obtain the address translation pair from the TSB area, the TSB physical address can be searched from the TLB, and this search consumes time. Moreover, the TSB virtual address can be calculated in the conventional technology, and the complexity in the calculation of the TSB virtual address results in an increase in the circuit scale and the installation cost.

SUMMARY

According to an aspect of an embodiment of the invention, an arithmetic processing apparatus includes: a TLB that stores a part of a TSB area included in a memory unit accessed by the arithmetic processing apparatus, the TSB area storing an address translation pair for translating a virtual address into a physical address; a cache memory that temporarily stores the address translation pair; a TSB base-physical-address storing unit that stores a TSB base physical address that is a starting physical address of the address translation pair stored in the memory unit; a TSB pointer calculating unit that calculates, based on the TSB base physical address and a virtual address to be converted, a TSB pointer used in obtaining from the TSB area a corresponding address translation pair corresponding to the virtual address to be converted; and a translation pair obtaining unit that obtains the corresponding address translation pair from the TSB area using the TSB pointer calculated and stores the corresponding address translation pair in the cache memory, if the corresponding address translation pair is not retrieved from the TLB or the cache memory.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram for explaining a TSB-PF-REG (TSB base-physical-address storing unit);

FIG. 4 is a diagram for explaining a formula for calculating a TSB pointer;

DESCRIPTION OF EMBODIMENT(S)

Figure 1:
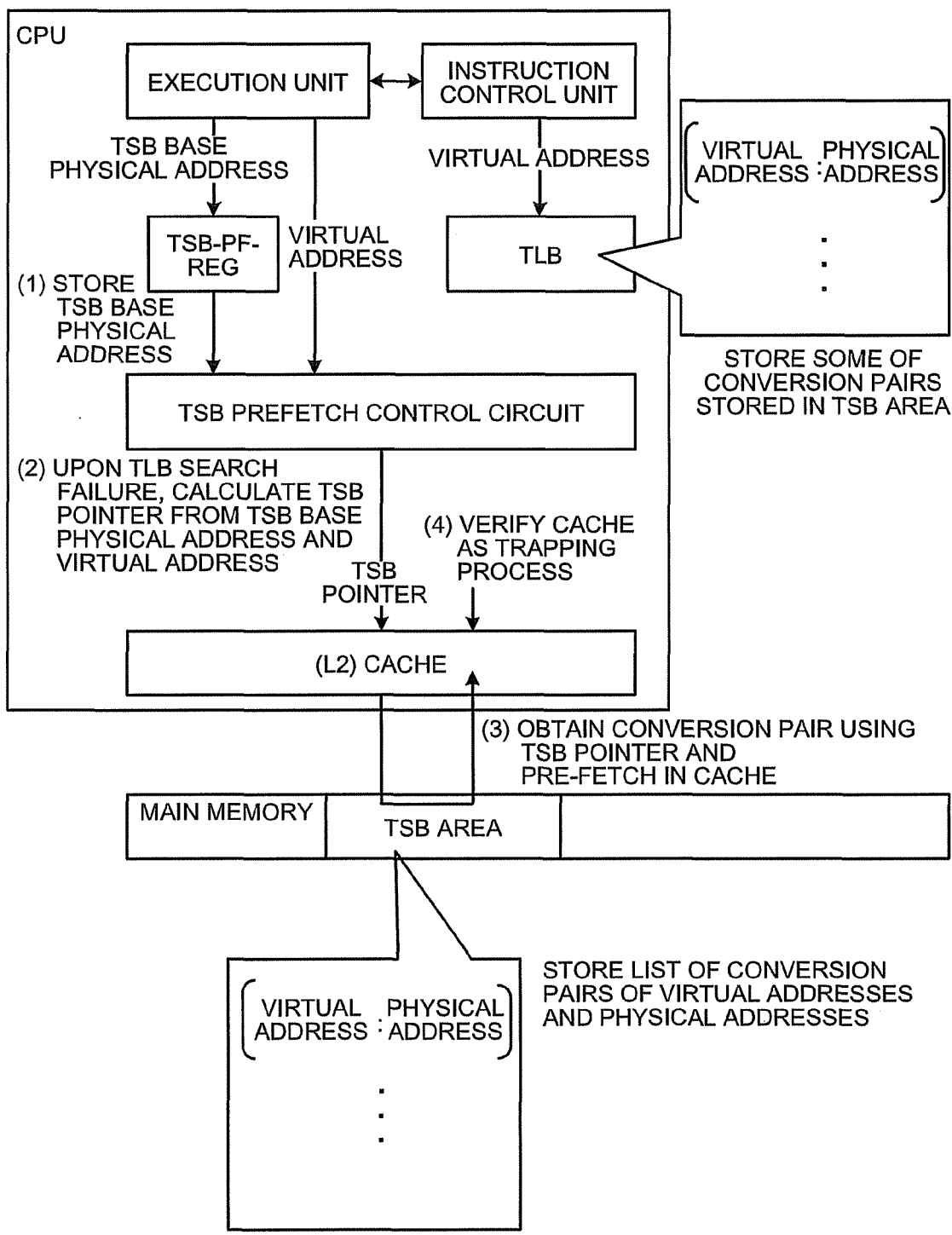
FIG. 1 is a diagram for explaining an outline and features of an arithmetic processing apparatus according to a first embodiment.

Exemplary embodiments of an arithmetic processing apparatus, an arithmetic processing program, and an arithmetic processing method according to the present invention will be described below with reference to the accompanying drawings. Main terms used in the embodiments, an outline and features of an arithmetic processing apparatus according to a first embodiment, a configuration of the arithmetic processing apparatus according to the first embodiment, steps of a process performed by the arithmetic processing apparatus according to the first embodiment, and effects of the first embodiment will be explained, followed by explanation of other embodiments.

First Embodiment

[Explanation of Terms]

Main terms used in the following embodiments are explained. A "virtual storage method" is a technology that makes a memory capacity greater than an actual memory capacity in a computer appear to be provided on the computer by using an external memory device as a save area of a memory.

In the "virtual storage method", two addresses, a "virtual address (VA)" and a "physical address (PA)", are used. When an application side performs reading and writing (memory access) with respect to a memory, a "virtual address" is used. A "physical address" is an address assigned to a component of a memory. For the purpose of translating a "virtual address" into a "physical address", a computer employing the "virtual storage method", stores a list (hereinafter referred to as "page table") of address translation pairs (translation table entry: TTE) for translating "virtual addresses" into "physical addresses" in a "translation storage buffer (TSB) area" of a main memory. [0021] However, if a central processing unit (CPU) is to refer to the page table stored in the "TSB area" every time a translation from a "virtual address" into a "physical address" is required, since access from the CPU to the main memory cannot be fast, a longer period of time is to be spent on the translation. To avoid this, normally, a cache memory dedicated to address translation and referred to as a "translation-lookaside buffer (TLB)" or "address translation buffer" is installed inside the CPU. The "TLB" stores some of the address translation pairs from the page table stored in the "TSB area".

When an application side performs reading and writing (memory access) with respect to the memory, first, an OS specifies a certain "virtual address" to the CPU. The CPU then searches the "TLB" for the certain "virtual address" specified by the OS. If the CPU fails in the search (i.e., when a TLB miss occurs), the CPU verifies, as a trap handling process, whether an address translation pair related to the certain "virtual address" (address translation pair with the "physical address" corresponding to the certain "virtual address") is stored in a "cache memory". If stored, then the address translation pair is registered in the "TLB". If not stored, the address translation pair is obtained from the "TSB area", stored in the "cache memory" for the time being, and then registered in the "TLB". Thus, when the CPU searches the "TLB" again for the certain "virtual address" for which the TLB miss has occurred, the CPU will not fail in the search (i.e., a TLB hit will occur).

In this way, when a TLB miss occurs, the CPU needs to register the address translation pair in the "TLB" as a trap handling process. However, since it must go through various steps, the penalty (such as delay) upon a TLB miss becomes big. The arithmetic processing apparatus according to the present embodiment reduces such a penalty upon a TLB miss.

[Outline and Features of Arithmetic Processing Apparatus According to First Embodiment]

Given below is the description of an outline and features of the arithmetic processing apparatus according to the first embodiment with reference to FIG. 1. FIG. 1 is a diagram for explaining the outline and features of the arithmetic processing apparatus according to the first embodiment. The arithmetic processing apparatus according to the first embodiment is implemented as a program executed in a control circuit or an instruction control unit provided in a CPU.

The arithmetic processing apparatus according to the first embodiment is outlined, with a configuration including a main memory with a TSB area and the CPU including a TLB and a (L2) cache memory, as performing as a trap handling process, upon a TLB search failure (TLB miss), verification of whether an address translation pair is stored in the (L2) cache memory, and if stored, registration of the stored address translation pair in the TLB, and if not stored, obtainment of the address translation pair from the TSB area, storage of it in the cache memory, and then registration of it in the TLB. Thus, in terms of effects, the main feature is the reduction in the penalty upon a TLB miss.

Explaining briefly in terms of the configuration with respect to this main feature, the arithmetic processing apparatus according to the first embodiment stores therein upon a store instruction from an OS a TSB base physical address of the address translation pair related to the virtual address specified in a TLB search (starting physical address of the address translation pair stored in a main memory) (see (1) in FIG. 1). Specifically, the arithmetic processing apparatus stores the TSB base physical address in a register (TSB-PreFetch-REGister: TSB-PF-REG; corresponding to a "TSB base-physical-address storing unit" mentioned in the claims).

Upon a TLB search failure (TLB miss) in such a configuration, the arithmetic processing apparatus substitutes the TSB base physical address stored in the TSB-PF-REG and the virtual address specified in the TLB search in a predetermined formula and calculates a TSB pointer (a pointer used in obtaining the address translation pair related to the certain virtual address from the TSB) (see (2) in FIG. 1). Specifically, the arithmetic processing apparatus calculates the TSB pointer at a TSB prefetch control circuit.

Subsequently, prior to performing the verification in the trap handling process (i.e., prior to verifying whether the address translation pair is stored in the (L2) cache memory), the arithmetic processing apparatus obtains the address translation pair from the TSB area using the calculated TSB pointer and stores the obtained address translation pair in the (L2) cache memory (see (3) in FIG. 1).

Thus, upon a TLB search failure (TLB miss), the arithmetic processing apparatus according to the first embodiment performs the normal trap handling process apart from the above described process, and as illustrated at step (4) in FIG. 1, "verification of whether the address translation pair is stored in the (L2) cache memory" is performed after step (3).

Because of that, the arithmetic processing apparatus according to the first embodiment is able to reduce the penalty upon a TLB miss.

Specifically, upon a TLB miss, the arithmetic processing apparatus according to the first embodiment pre-fetches the address translation pair concurrently with (or prior to) the normal trap handling process and stores the address translation pair in the (L2) cache memory prior to performing the verification in the trap handling process. That prevents a cache miss from occurring during the trap handling process. As a result, it becomes possible to conceal memory latency and speed up the trap handling process. In other words, since a cache hit occurs without fail when a memory access to the TSB is requested in the trap handling process, it is possible to register the address translation pair instantly in the TLB.

Moreover, in the process of obtaining the address translation pair from the TSB area of the main memory and pre-fetching it in the (L2) cache memory, the arithmetic processing apparatus according to the first embodiment does not need to search the TLB for the TSB physical address but only needs to use the TSB base physical address and virtual address that have already been stored in the register. As a result, the amount of time for the process of searching the TLB for the TSB physical address is reduced, thus reducing the penalty upon a TLB miss. Furthermore, in the arithmetic processing apparatus according to the first embodiment, the calculation of TSB physical address is simple, and thus it is possible to reduce the circuit scale and the installation cost.

[Configuration of Arithmetic Processing Apparatus According to First Embodiment]

Figure 2:
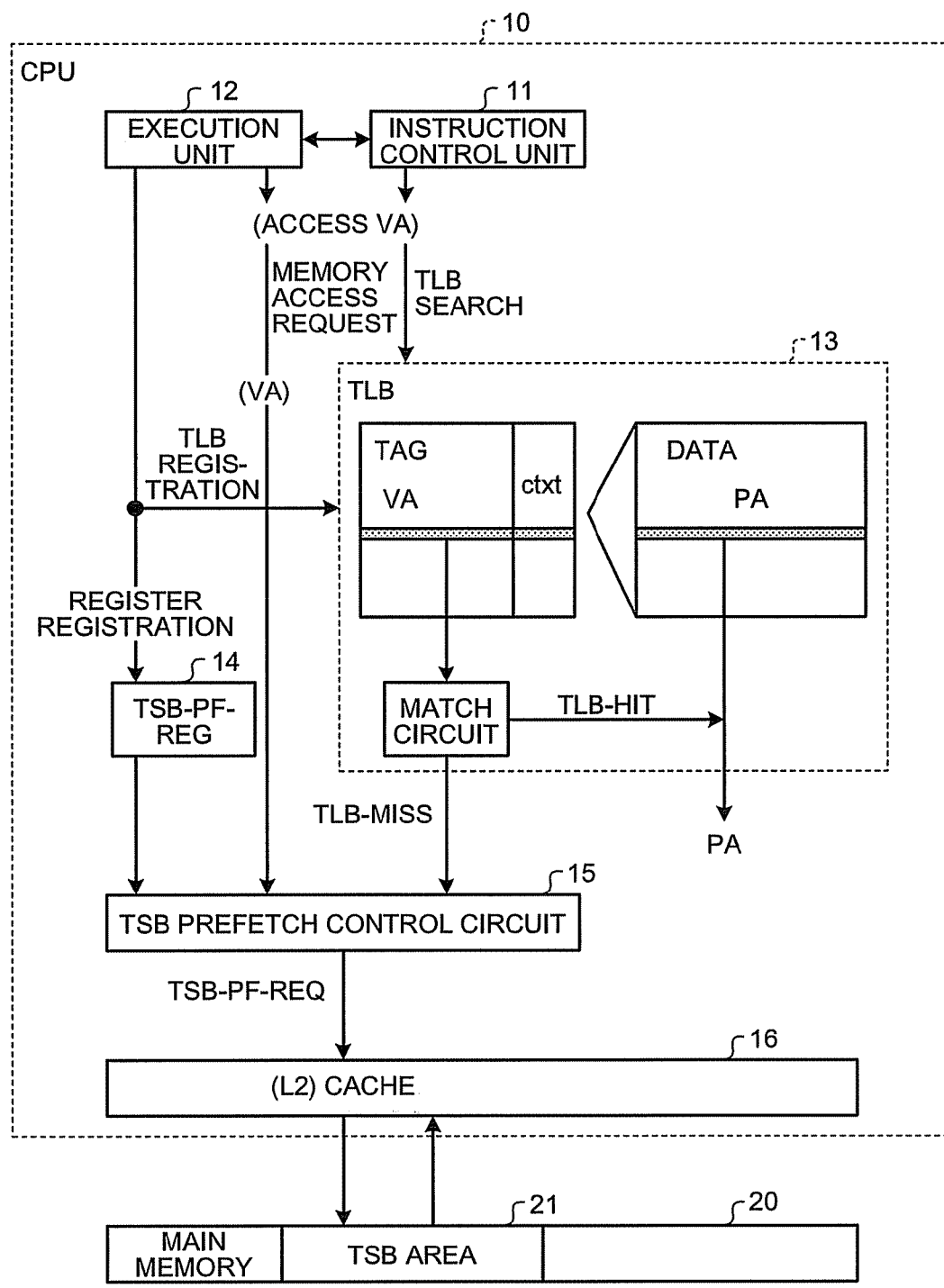
FIG. 2 is a block diagram of a configuration of the arithmetic processing apparatus according to the first embodiment.
Figure 5:
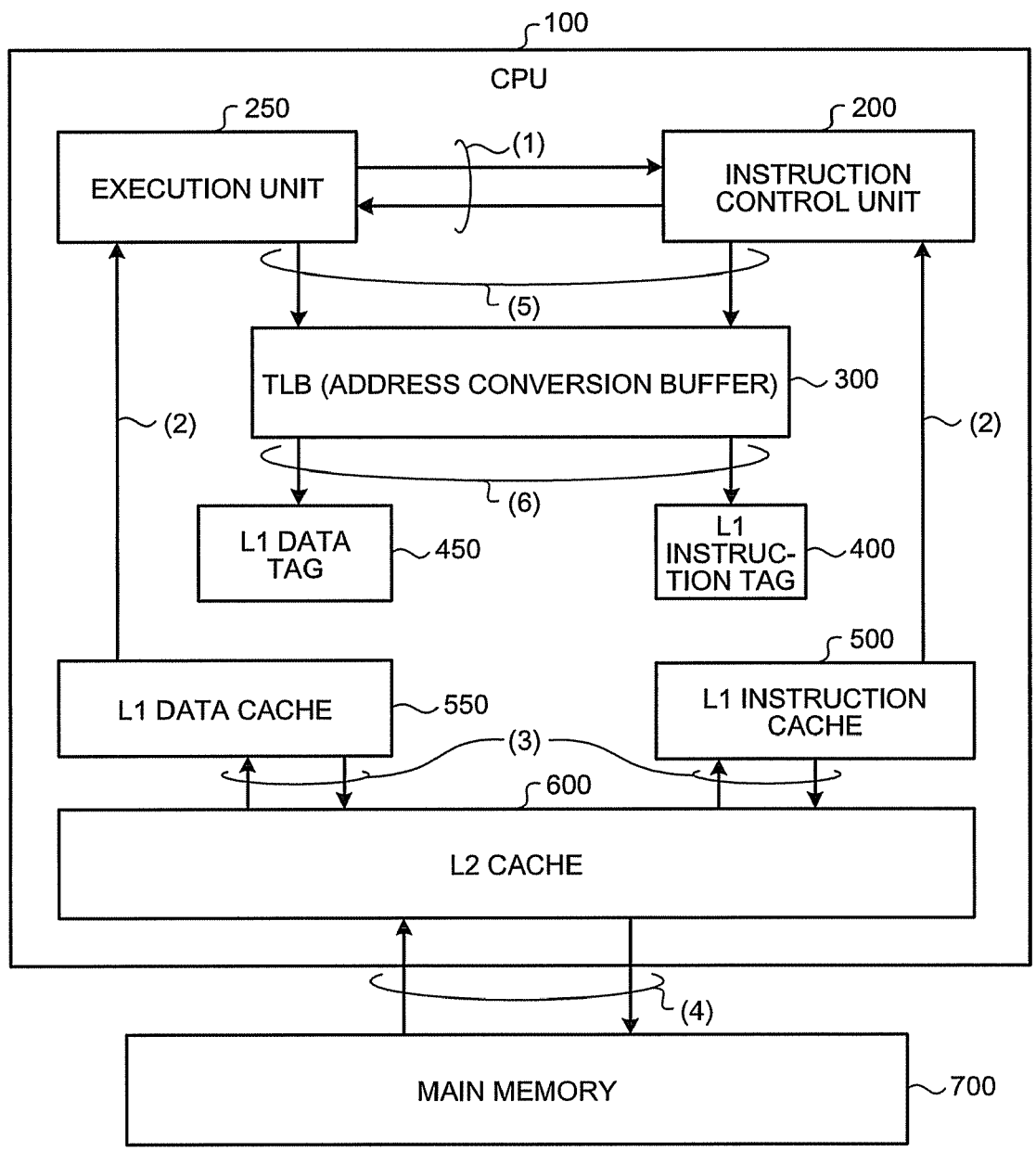
FIG. 5 is a block diagram of a general configuration of a CPU.

A configuration of the arithmetic processing apparatus according to the first embodiment is described below with reference to FIGS. 2 to 5. FIG. 2 is a block diagram of the configuration of the arithmetic processing apparatus according to the first embodiment. FIG. 3 is a diagram for explaining the TSB-PF-REG (TSB base-physical-address storing unit). FIG. 4 is a diagram for explaining a formula for calculating a TSB pointer. FIG. 5 is a block diagram of a general configuration of a CPU.

Firstly, a configuration of the arithmetic processing apparatus according to the first embodiment is explained with reference to FIG. 2. The arithmetic processing apparatus according to the first embodiment is implemented as a program executed in a control circuit or an instruction control unit provided in a CPU 10. For convenience in explaining the configuration of the arithmetic processing apparatus according to the first embodiment, only a part of a configuration of a CPU is illustrated as an example. Thus, FIG. 2 does not represent the entire configuration of the arithmetic processing apparatus according to the present embodiment.

The CPU 10 is closely related to the present embodiment and, as illustrated in FIG. 2, mainly includes an instruction control unit 11, an execution unit 12, a TLB 13, a TSB-PF-REG 14, a TSB prefetch control circuit 15, and a (L2) cache memory 16. A main memory 20 including a TSB area 21 is provided as a memory device outside the CPU 10.

The TLB 13 stores some of address translation pairs from a page table stored in the TSB area 21. Specifically, the TLB 13 stores therein an address translation pair of a virtual address ("VA" in FIG. 2) and a physical address ("PA" in FIG. 2). In addition, the TLB 13 includes a MATCH circuit as illustrated in FIG. 2. Upon receiving an instruction to search the TLB 13 ("TLB search" in FIG. 2) from the instruction control unit 11, the MATCH circuit determines whether values used in the search through the TLB 13 and values stored in the TLB 13 match, with respect to the two, the virtual address ("VA" in FIG. 2) and the context ID ("ctxt" in FIG. 2), and determines it to be a TLB hit ("TLB-HIT" in FIG. 2) if matched and a TLB miss ("TLB-MISS" in FIG. 2) if not matched.

The TSB-PF-REG 14 stores therein a TSB base physical address of an address translation pair related to a certain virtual address (starting physical address of the address translation pair stored in the main memory 20). Specifically, the TSB-PF-REG 14, upon a store instruction from an OS, stores therein in advance a TSB base physical address of an address translation pair related to a certain virtual address specified in a search ("access VA" in FIG. 2). The TSB base physical address is the base (starting physical address) of the physical address in the main memory 20 storing the address translation pair. The TSB-PF-REG 14 corresponds to a "TSB base-physical-address storing unit" mentioned in the claims.

An example of the TSB-PF-REG 14 is explained. As illustrated in FIG. 3, the TSB-PF-REG 14 is arranged, for example, as eight registers per thread. A "Context number=0" is mainly for a "kernel mode", while a "Context number □0" is mainly for a "user mode". For each of these, two types of TLB (1st/2nd) for "instruction" and for "data" may be specified. Moreover, the TSB-PF-REG 14 may also specify a page size.

Furthermore, the following fields are arranged in the TSB-PF-REG 14 for example. For example, a "TSB base in physical" field specifies a TSB base pointer with a physical address. A "Valid" field specifies a selection of performing pre-fetching when a "valid bit" is "1" and not performing pre-fetching when the "valid bit" is "0". A "page_size" field specifies the page size of the TSB area 21. A "TSB_size" field specifies the number of entries (512×2**TSB_size) in the TSB area 21.

The execution unit 12 carries out operations. Features closely related to the present embodiment are explained. The execution unit 12 stores a TSB physical address in the TSB-PF-REG 14, apart from a normal trap handling process.

The instruction control unit 11 receives an instruction from the OS and controls the flow of process performed by the CPU 10. The features closely related to the present embodiment are explained. The instruction control unit 11 performs, apart from a normal trap handling process, a process of searching the TLB 13 for a certain virtual address specified by the OS, a process of storing a TSB base physical address in the TSB-PF-REG 14, a process of calculating a TSB pointer, and a process of storing an address translation pair obtained from the TSB area 21 in the (L2) cache memory 16. Moreover, the instruction control unit 11 implements, in tandem with the TSB prefetch control circuit 15 described later, functions that correspond to a "TSB pointer calculating unit" and a "translation pair obtaining unit" mentioned in the claims.

In describing the TSB prefetch control circuit 15, the specific steps of the process performed by the instruction control unit 11 and the TSB prefetch control circuit 15 will be described. When performing a memory access, the instruction control unit 11 searches the TLB 13 ("TLB search" in FIG. 2) for a certain virtual address ("access VA" in FIG. 2) specified by the OS. If the search fails (TLB miss occurs), the instruction control unit 11 sends a TLB miss signal indicating the occurrence of the TLB miss, the virtual address, and a context number to the TSB prefetch control circuit 15, apart from controlling the normal trap handling process.

Upon receiving the TLB miss signal, the virtual address, and the context number from the instruction control unit 11, the TSB prefetch control circuit 15 selects a TSB-PF-REG 14 to be read out, depending on the value of the context number and whether the signal is from an instruction TLB or a signal from a data TLB. Then, the TSB prefetch control circuit 15 reads the "1st-REG" and the "2nd-REG" from the TSB-PF-REG 14 in two cycles, calculates a TSB pointer (TSB prefetch address) for each, and issues a TSB prefetch request (a request for obtaining an address translation pair from the TSB area 21, depicted as "TSB-PF-REQ" in FIG. 2).

Herein, "1st" and "2nd" correspond to the fact that the configuration of the TLB 13 is divided into a "1st-TLB" and a "2nd-TLB" to support two types of page sizes. Since it is not known whether a desired TLB entry corresponds to the "1st-TLB" or the "2nd-TLB", the TSB prefetch control circuit 15 issues the TSB prefetch request to both.

The TSB prefetch control circuit 15 then reads the selected TSB-PF-REG 14 and, if the "valid bit" is "0", refrains from issuing the TSB prefetch request. The TSB prefetch control circuit 15 refrains from issuing the TSB prefetch request if an address parity error or a register parity error is detected.

The TSB prefetch control circuit 15 substitutes the value read from the selected TSB-PF-REG 14 and the virtual address transmitted from the instruction control unit 11 in a predetermined formula and calculates a TSB pointer. Using the TSB pointer calculated, the TSB prefetch control circuit 15 issues a TSB prefetch request, and sends, together with a request signal, the TSB pointer calculated. The TSB prefetch control circuit 15 obtains the address translation pair from the main memory 20 using the TSB pointer and stores the obtained address translation pair in the (L2) cache memory 16.

The formula is explained by specifically giving an example. The TSB prefetch control circuit 15 calculates the TSB pointer using a predetermined formula like the one illustrated in FIG. 4. Here, "TSB pointer" represents a TSB prefetch address, "TSB base" represents the "TSB base in physical" field in the TSB-PF-REG 14, "N" represents the "TSB_size", "page_sz" represents the TSB page size, and "|" represents bit concat (concatenation of character strings).

The TSB prefetch control circuit 15 may be implemented using, for example, an existing control circuit such as a control circuit having a prefetch function of a (L1) cache memory.

From among the configuration of the arithmetic processing apparatus according to the first embodiment, components closely related to the present embodiment have been described. Given below is the description on an outline of a general CPU with reference to FIG. 5. For convenience in explaining the outline of the CPU, only a partial configuration of the CPU is illustrated as an example. Thus, FIG. 5 does not represent the entire configuration of the arithmetic processing apparatus according to the present embodiment. Moreover, the arithmetic processing apparatus according to the present embodiment may not include all of the components illustrated in FIG. 5. Furthermore, numbers (1) to (6) given in FIG. 5 are assigned for convenience in explanation and do not represent the sequence of steps.

As illustrated in FIG. 5, a CPU 100 generally includes an instruction control unit 200, an execution unit 250, a TLB 300, an L1 instruction TAG 400, an L1 data TAG 450, an L1 instruction cache 500, an L1 data cache 550, and an L2 cache 600.

With such a configuration, the CPU 100 carries out an operation according to an instruction stored in a memory device installed in a computer and processes information according to the result of the operation. Herein, the term "instruction" does not refer to a command that is input by a user of the computer from, for example, a keyboard or a command as a line of a program programmed by a developer. In a computer, such a command is first translated into computer-comprehensible machine language, then reconfigured in computer-recognizable binary numbers, and consequently divided in minimum processable units that the CPU 100 is able to process as the "instruction".

The instruction control unit 200 controls the flow of processes performed by the CPU 100. Specifically, the instruction control unit 200 reads an "instruction" to be processed in the CPU 100 from a memory device, interprets it, and sends the interpretation result to the execution unit 250 (see (1) in FIG. 5). The execution unit 250 carries out an operation. Specifically, the execution unit 250 reads "data" that is the target of the "instruction" from a memory device, performs an operation according to the "instruction" interpreted by the instruction control unit 200, and sends the result of operation to the instruction control unit 200 (see (1) in FIG. 5).

As described above, the instruction control unit 200 and the execution unit 250 read the "instruction" and "data" from a memory device. That memory device may be a cache memory such as a primary (Level 1) cache (hereinafter, "L1 cache") and a secondary (Level 2) cache (hereinafter, "L2 cache"). Normally, the cache memories are installed inside the CPU 100 in a hierarchical structure. In the CPU 100 illustrated in FIG. 5, the L1 instruction cache 500 that is an L1 cache dedicated to instructions, the L1 data cache 550 that is an L1 cache dedicated to data are provided, and the L2 cache 600 is provided as an L2 cache memory. A main memory 700 is not part of the CPU 100 but is provided external to the CPU 100 as a memory device.

Generally, the L1 instruction cache 500 and the L1 data cache 550 are able to operate by the same clock as the CPU 100 and to speedily respond to a request from the instruction control unit 200 or the execution unit 250 (see (2) in FIG. 5). However, usually, the total capacity of the L1 instruction cache 500 and the L1 data cache 550 is about 32K to 128K and thus is not capable of storing a large volume of information. Thus, from among the information that cannot be stored in the L1 instruction cache 500 and the L1 data cache 550, the L2 cache 600 stores less frequently used information (see (3) in FIG. 5). The information that cannot be stored in the L2 cache 600 is stored in the main memory 700 (see (4) in FIG. 5).

At the start of a memory access process by the instruction control unit 200 and the execution unit 250, the "instruction" and "data" are in the main memory 700 while nothing is stored in the L1 instruction cache 500, the L1 data cache 550, or the L2 cache 600. Upon an attempt by the instruction control unit 200 and the execution unit 250 to read an "instruction" and "data" from the main memory 700, these "instruction" and "data" are loaded in the L1 instruction cache 500 and L1 data cache 550, or the L2 cache 600. Subsequently, the instruction control unit 200 and the execution unit 250 read the "instruction" and "data" from the high-speed L1 instruction cache 500 and L1 data cache 550, or the L2 cache 600, and not from the low-speed main memory 700.

In other words, the "instruction" and "data" the instruction control unit 200 and the execution unit 250 try to read are not necessarily stored in the L1 instruction cache 500 and the L1 data cache 550. Thus, the instruction control unit 200 and the execution unit 250 use the L1 instruction TAG 400 or the L1 data TAG 450. That is, as the "instruction" and "data" are loaded in the L1 instruction cache 500 and the L1 data cache 550, numeric values indicating at which addresses in the main memory 700 the "instruction" and "data" are stored are set in the L1 instruction TAG 400 and the L1 data TAG 450. Accordingly, upon attempting to read the "instruction" and "data", the instruction control unit 200 and the execution unit 250 make an inquiry to the L1 instruction TAG 400 and the L1 data TAG 450 to verify whether the "instruction" and "data" to be read are stored in the L1 instruction cache 500 and the L1 data cache 550.

In the computer illustrated in FIG. 5, the "virtual storage method" is employed as already described. Thus, at the time of reading an "instruction" and "data" as illustrated in FIG. 5, the instruction control unit 200 and the execution unit 250 first specify a "virtual address" to the TLB 300 (see (5) in FIG. 5) and, after the TLB 300 translates it into a "physical address", an inquiry is made to the L1 instruction TAG 400 and the L1 data TAG 450 (see (6) in FIG. 5).

The above is the outline of the general CPU. Apart from the general components of the CPU 100 illustrated in FIG. 5, the arithmetic processing apparatus according to the present embodiment includes the TSB-PF-REG 14 and the TSB prefetch control circuit 15 as structural components. The instruction control unit 11 controls the calculation of the TSB pointer and the obtaining of the address translation pair, and thus it is possible to reduce the penalty upon a TLB miss.

[Steps of Process by Arithmetic Processing Apparatus According to First Embodiment]

Figure 6:
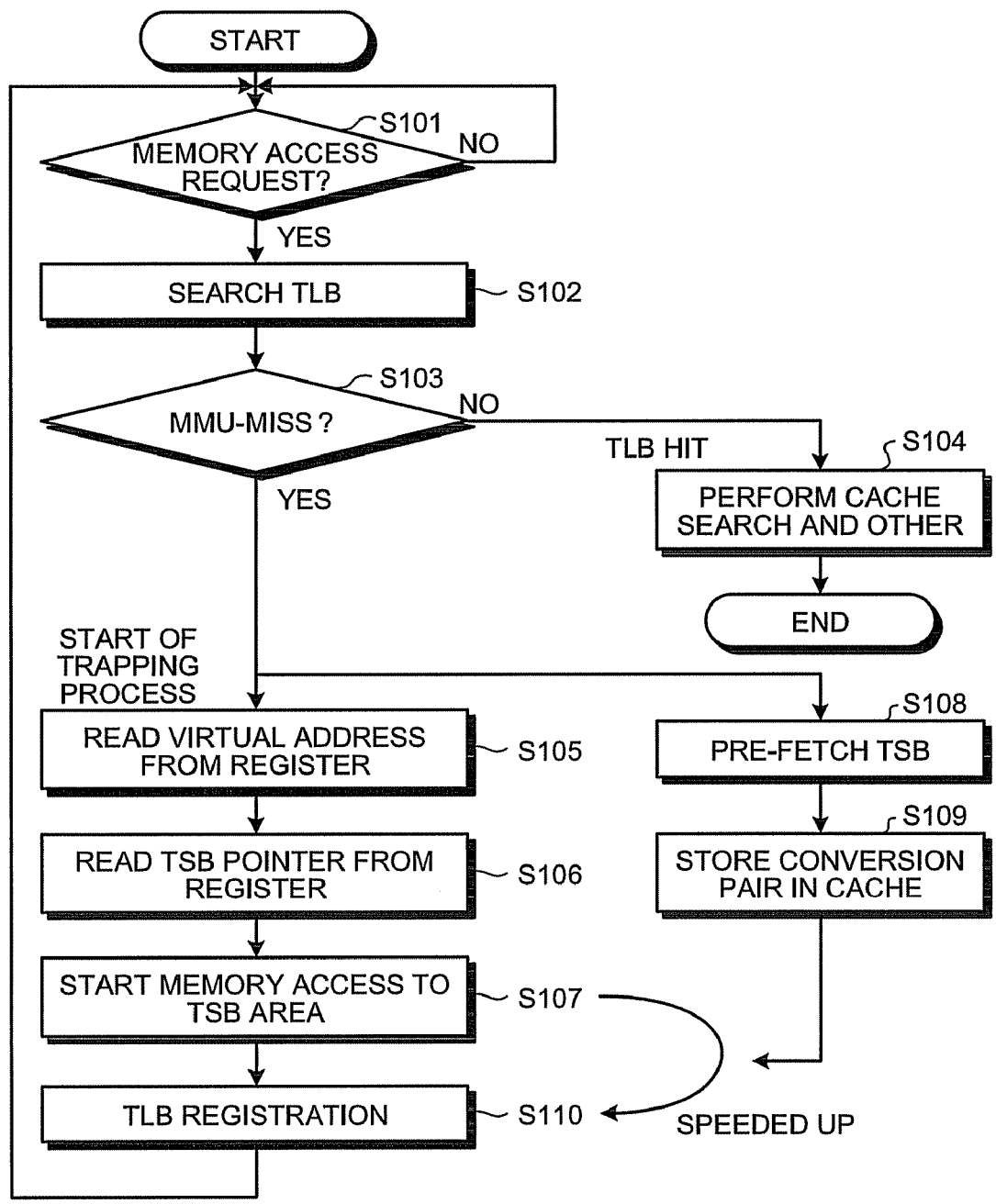
FIG. 6 is a flowchart of steps of a process performed by the arithmetic processing apparatus according to the first embodiment.
Figure 7:
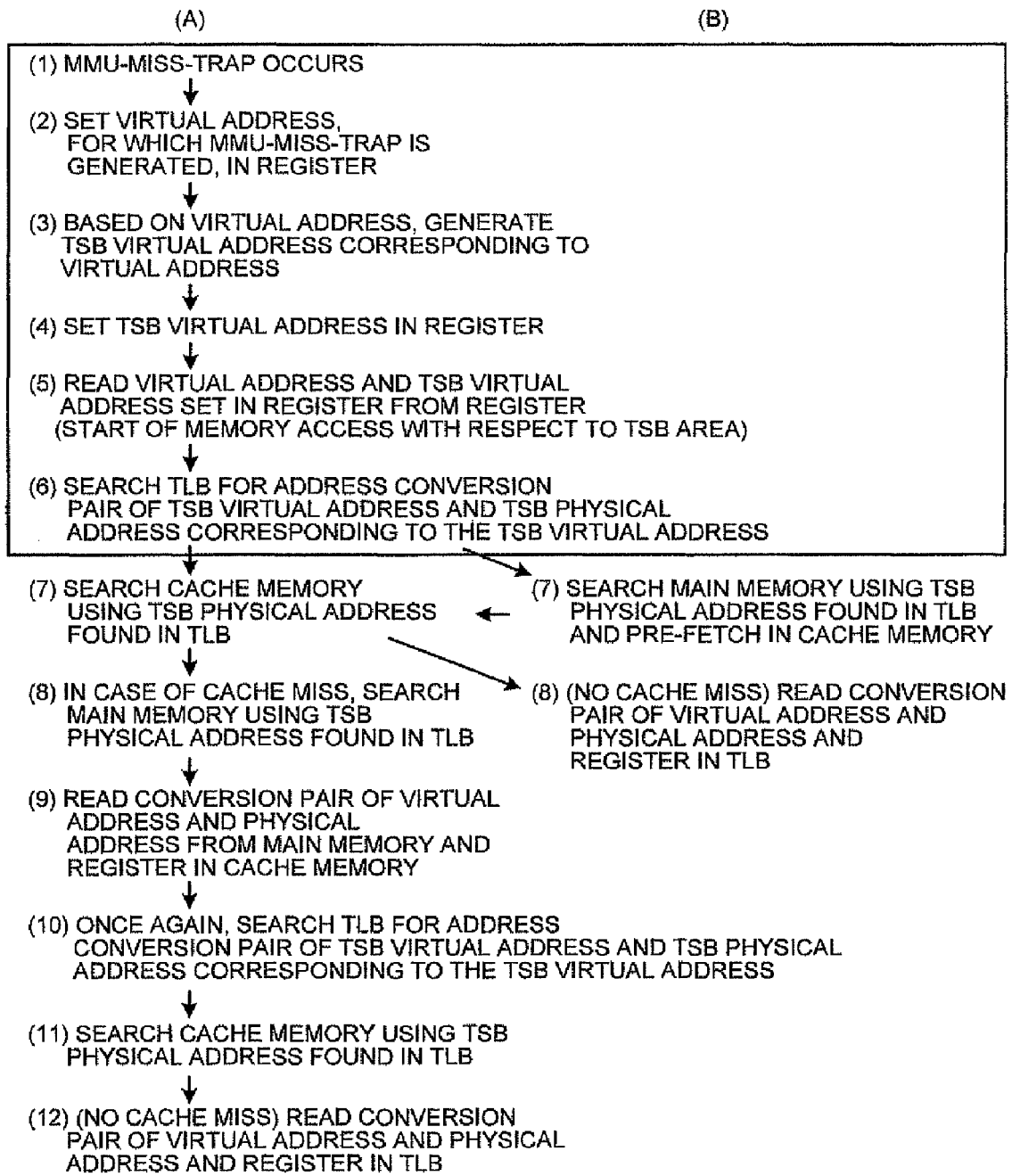
FIG. 7 is a diagram for explaining a conventional technology.

Given below are steps of a process performed by the arithmetic processing apparatus according to the first embodiment with reference to FIG. 6. FIG. 6 is a flowchart indicating the steps of the process by the arithmetic processing apparatus according to the first embodiment. From among the steps of the process illustrated in FIG. 6, Steps S105 to S110 represent a normal trap handling process. Steps S108 and S109 represent the steps of the process characteristic to the arithmetic processing apparatus according to the first embodiment and to achieve the effects of the present embodiment, these steps are fed back to the normal trap handling process.

The instruction control unit 11 according to the first embodiment determines whether a memory access request has been received (Step S101). If a memory access request has not been received (No at Step S101), the instruction control unit 11 returns to the step of determining whether a memory access request has been received.

If a memory access request has been received (Yes at Step S101), the instruction control unit 11 searches the TLB 13 for a certain virtual address specified by the OS (Step S102).

Then, the instruction control unit 11 determines whether the determination result determined by the MATCH circuit in the TLB 13 is a TLB miss (MMU-MISS) (Step S103). If it is not a TLB miss (No at Step S103), then the instruction control unit 11 performs a search through a cache memory and other processes using an address translation result (Step S104) and ends the processes.

If it is a TLB miss (Yes at Step S103), the instruction control unit 11 performs a normal trap handling process. Specifically, the instruction control unit 11 sets the certain virtual address, for which the MMU-MISS-TRAP has been generated, in a register. Then, based on the virtual address, the instruction control unit 11 generates a TSB virtual address that corresponds to the virtual address and sets it in the register. Subsequently, the instruction control unit 11 reads the virtual address and the TSB virtual address, which have been set in the register from the register (Step S105) and performs Step S106 as the normal trap handling process.

The arithmetic processing apparatus according to the present embodiment is characterized in that, prior to (or concurrently with) reporting the MMU-MISS-TRAP to the OS, a TSB pointer is calculated from the TSB base physical address that has been stored in advance in the TSB-PF-REG 14 and the MMU-MISSed virtual address, a required address translation pair is pre-fetched, and the address translation pair is stored in the (L2) cache memory. As a result, it becomes possible to speedily provide the address translation pair upon attempting to obtain this address translation pair by the trap handling process.

That is, as illustrated in FIG. 6, when a TLB miss occurs (Yes at Step S103), the instruction control unit 11 performs TSB pre-fetching apart form the normal trap handling process (Step S108). Specifically, the instruction control unit 11 sends a TLB miss signal indicating the occurrence of the TLB miss, the virtual address, and a context number to the TSB prefetch control circuit 15. Then, the TSB prefetch control circuit 15 reads the TSB-PF-REG 14, and substitutes the read value and the virtual address transmitted from the TLB 13 into a predetermined formula, to calculate a TSB pointer. Subsequently, the TSB prefetch control circuit 15 issues a TSB prefetch request using the calculated TSB pointer and sends a request signal and the calculated TSB pointer (Step S108).

Then, the TSB prefetch control circuit 15 obtains from the main memory 20 the address translation pair using the TSB pointer and makes the (L2) cache memory 16 hold the obtained address translation pair (Step S109). Because the address translation pair is thus held in the (L2) cache memory 16 at Step S109, in the normal trap handling process, upon start of a memory access to the TSB area 21 (Step S107), a cache hit occurs without fail.

[Effects of First Embodiment]

As described above, the arithmetic processing apparatus according to the first embodiment accesses a memory unit including a TSB area storing an address translation pair for translating a virtual address into a physical address. The arithmetic processing apparatus includes a TLB that stores therein a part of the TSB area, a cache memory that temporarily stores therein the address translation pair, and a TSB base-physical-address storing unit that stores therein a TSB base physical address that is a starting physical address of the address translation pair stored in the memory unit. Based on the TSB base physical address and a virtual address to be converted, a TSB pointer is calculated that is used in obtaining an address translation pair from the TSB area. When the address translation pair corresponding to the virtual address to be converted is not retrieved from the TLB or the cache memory, the address translation pair corresponding to the virtual address to be converted is obtained from the TSB area using the calculated TSB pointer and stored in the cache memory. As a result, it is possible to reduce the penalty upon a TLB miss.

Specifically, upon a TLB miss, the arithmetic processing apparatus according to the first embodiment pre-fetches the address translation pair concurrently with (or prior to) the normal trap handling process and stores the address translation pair in the (L2) cache memory prior to verification in the trap handling process. As a result, occurrence of a cache miss is prevented during the trap handling process, and it is possible to conceal memory latency and to speed up the trap handling process. In other words, since a cache hit is obtained without fail upon a memory access request to the TSB in the trap handling process, it is possible to register the address translation pair instantly in the TLB.

Thus, in the process of obtaining the address translation pair from the TSB area of the main memory and pre-fetching it in the (L2) cache memory, the arithmetic processing apparatus according to the first embodiment does not need to search the TLB for the TSB physical address but only needs to use the TSB base physical address and the virtual address that have already been stored in a register. Therefore, the amount of time required to search the TLB for the TSB physical address is shortened, reducing the penalty upon a TLB miss. Furthermore, since the calculation of the TSB physical address is simple, it is possible to reduce the circuit scale and thus the installation cost.

Second Embodiment

[Other Embodiments]

Besides the first embodiment described above, it is also possible to implement various different embodiments.

[System Configuration]

The steps of the process and control described above and illustrated in the drawings (such as FIG. 6), the specific names (such as FIG. 2), and the information including various data and parameters may be arbitrarily modified unless otherwise specified.

Moreover, each structural element of each apparatus illustrated in the drawings are conceptual and functional, and does not have to be physically configured as illustrated (such as in FIG. 2). That is, the specific embodiments of distribution or integration of each apparatus are not limited to those illustrated in the drawings, and all or a part of it may be distributed or integrated functionally or physically in any units based on various types of loads and use conditions. All or a part of the process functions performed by each apparatus may be realized by a CPU or a computer program analyzed and executed by the CPU, or realized as hardware by wired logic.

Furthermore, the arithmetic processing method described in the present embodiment may be implemented by executing in a CPU a program prepared in advance. The program may be distributed over a network such as the Internet. The program may be stored in a computer-readable recording medium such as a hard disk, a flexible disk (FD), a CD-ROM, an MO, or a DVD to be read from the recording medium and executed by a CPU.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing apparatus comprising:
a TLB that stores a part of a TSB area included in a memory unit accessed by the arithmetic processing apparatus, the TSB area storing an address translation pair for translating a virtual address into a physical address;
a cache memory that temporarily stores the address translation pair; a TSB base-physical-address storing unit that stores a TSB base physical address that is a starting physical address of the address translation pair stored in the memory unit;
a TSB pointer calculating unit that calculates, based on the TSB base physical address and a virtual address to be converted, a TSB pointer used in obtaining from the TSB area a corresponding address translation pair corresponding to the virtual address to be converted; and
a translation pair obtaining unit that obtains the corresponding address translation pair from the TSB area using the TSB pointer calculated, and stores the corresponding address translation pair in the cache memory, if the corresponding address translation pair is not retrieved from the TLB or the cache memory, wherein
if the corresponding address translation pair is not retrieved from the TLB, the translation pair obtaining unit verifies, via a trap handling process of an OS, whether the corresponding address translation pair is stored in the cache memory, and
the translation pair obtaining unit stores the corresponding address translation pair obtained from the TSB area using the TSB pointer in the cache memory prior to the verification via the trap handling process.

2. The arithmetic processing apparatus according to claim 1, wherein if the virtual address to be converted is not stored in the cache memory, the translation pair obtaining unit registers the corresponding address translation pair in the TLB after obtaining the corresponding address translation pair from the TSB area and storing the corresponding address translation pair in the cache memory.

3. The arithmetic processing apparatus according to claim 1, further comprising a register unit that controls obtaining of an address translation pair from the TSB area, wherein based on information stored in the register unit, obtaining of the address translation pair from the TSB area by the translation pair obtaining unit is controlled.

4. The arithmetic processing apparatus according to claim 1, wherein, when a hardware error occurs within the arithmetic processing apparatus, the translation pair obtaining unit forbids obtaining of an address translation pair from the TSB area by the translation pair obtaining unit.

5. An arithmetic processing method comprising:
   storing a TSB base physical address that is a starting physical address of an address translation pair stored in a memory unit accessed by an arithmetic processing apparatus that performs the arithmetic processing method, the memory unit including a TSB area storing an address translation pair for concerting a virtual address into a physical address, the arithmetic processing apparatus including a TLB storing a part of the TSB area and a cache memory temporarily storing the address translation pair;
   calculating, based on the TSB base physical address and a virtual address to be converted, a TSB pointer used in obtaining from the TSB area a corresponding address translation pair corresponding to the virtual address to be converted; and
   obtaining the corresponding address translation pair from the TSB area using the TSB pointer calculated, and storing the corresponding address translation pair in the cache memory, if the corresponding address translation pair is not retrieved from the TLB or the cache memory, further comprising:
   if the corresponding address translation pair is not retrieved from the TLB, verifying, via a trap handling process of an OS, whether the corresponding address translation pair is stored in the cache memory; and
   storing the corresponding address translation pair obtained from the TSB area using the TSB pointer in the cache memory prior to the verification via the trap handling process.

6. The arithmetic processing method according to claim 5, further comprising:
   if the virtual address to be converted is not stored in the cache memory, registering the corresponding address translation pair in the TLB after obtaining the corresponding address translation pair from the TSB area and storing the corresponding address translation pair in the cache memory.

7. The arithmetic processing method according to claim 5, further comprising:
   based on information stored in a register unit of the arithmetic processing apparatus, controlling obtaining of an address translation pair from the TSB area.

8. The arithmetic processing method according to claim 5, further comprising:
   when a hardware error occurs within the arithmetic processing apparatus, forbidding obtaining of an address translation pair from the TSB area.

\* \* \* \* \*

UNITED STATES PATENT AND TRADEMARK OFFICE
CERTIFICATE OF CORRECTION

PATENT NO. : 8,296,518 B2
APPLICATION NO. : 12/624531
DATED : October 23, 2012
INVENTOR(S) : Masaharu Maruyama It is certified that error appears in the above-identified patent and that said Letters Patent is hereby corrected as shown below:

In the Claims

In Col. 12, Line 45, In Claim 1, after "calculated," delete "and".

In Col. 13, Line 25, In Claim 5, after "calculated," delete "and".

Signed and Sealed this
Twenty-ninth Day of October, 2013

Teresa Stanek Rea
*Deputy Director of the United States Patent and Trademark Office*